United States Patent
Weifenbach (10) Patent No.: US 10,513,338 B2
(45) Date of Patent: Dec. 24, 2019

(54) AIRCRAFT CABIN AREA COMPRISING A DOOR AISLE AND AN AIRCRAFT MONUMENT ARRANGEMENT, AIRCRAFT COMPRISING SUCH AN AIRCRAFT CABIN AREA, AND METHOD OF OPERATING SAID AIRCRAFT

(71) Applicant: Airbus Operations GmbH, Hamburg (DE)

(72) Inventor: Joerg Weifenbach, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 182 days.

(21) Appl. No.: 15/689,797

(22) Filed: Aug. 29, 2017

(65) Prior Publication Data
US 2018/0072425 A1    Mar. 15, 2018

(30) Foreign Application Priority Data
Sep. 15, 2016    (EP) .................................... 16188929

(51) Int. Cl.
*B64D 11/04*    (2006.01)
*B64D 11/00*    (2006.01)

(52) U.S. Cl.
CPC .......... *B64D 11/04* (2013.01); *B64D 11/0007* (2013.01); *Y02T 50/46* (2013.01)

(58) Field of Classification Search
CPC ............................ B64D 11/04; B64D 11/0023
See application file for complete search history.

(56) References Cited

U.S. PATENT DOCUMENTS

| 7,159,821 B2* | 1/2007 | Harrington | ........ B64D 11/0007 244/118.5 |
| 9,738,385 B2* | 8/2017 | Mayer | ................ B64D 11/0693 |
| 2013/0082140 A1 | 4/2013 | Ehlers et al. | |

(Continued)

FOREIGN PATENT DOCUMENTS

| WO | 2011116982 | 9/2011 |
| WO | 2013056796 | 4/2013 |

(Continued)

OTHER PUBLICATIONS

European Search Report, dated Feb. 23, 2017, priority document.

*Primary Examiner* — Alvin C Chin-Shue
(74) *Attorney, Agent, or Firm* — Greer, Burns & Crain, Ltd.

(57) ABSTRACT

An aircraft cabin area comprises a door aisle extending between two opposite aircraft doors and an aircraft monument arrangement. The door aisle has a door section adjacent each aircraft door. The monument arrangement comprises a first monument facing the door aisle in a monument section of the door aisle with an access side of the first monument. The monument section extends between the two opposite door sections. The monument arrangement further comprises at least one first trolley parking place for accommodating at least one trolley. The first trolley parking place is provided in the region of the door aisle monument section adjacent the first monument access side to enlarge a base area of the first monument when a trolley is parked therein. Further, at least one second trolley parking place for accommodating at least one trolley is provided in the region of at least one of the door sections.

16 Claims, 3 Drawing Sheets

(56) References Cited

U.S. PATENT DOCUMENTS

| | | | |
|---|---|---|---|
| 2013/0105627 A1 | 5/2013 | Orson et al. | |
| 2014/0209741 A1* | 7/2014 | Boenning | B64D 11/06 244/118.6 |
| 2014/0224929 A1 | 8/2014 | Weitzel | |
| 2014/0339360 A1* | 11/2014 | Moje | B64D 11/00 244/118.5 |
| 2014/0339364 A1* | 11/2014 | Ehlers | B64D 11/00 244/118.6 |
| 2015/0057796 A1* | 2/2015 | Boodaghians | B64D 11/0007 700/236 |
| 2015/0069891 A1* | 3/2015 | Schimanowski | B64D 11/04 312/242 |
| 2015/0360782 A1* | 12/2015 | Jin | B64D 11/02 244/118.5 |
| 2016/0009395 A1 | 1/2016 | Savian et al. | |
| 2016/0167784 A1 | 6/2016 | Schliwa et al. | |
| 2017/0057638 A1* | 3/2017 | Chen | B64D 11/04 |

FOREIGN PATENT DOCUMENTS

| | | |
|---|---|---|
| WO | 2014124987 | 8/2014 |
| WO | 2015014850 | 2/2015 |

* cited by examiner

AIRCRAFT CABIN AREA COMPRISING A DOOR AISLE AND AN AIRCRAFT MONUMENT ARRANGEMENT, AIRCRAFT COMPRISING SUCH AN AIRCRAFT CABIN AREA, AND METHOD OF OPERATING SAID AIRCRAFT

CROSS-REFERENCES TO RELATED APPLICATIONS

This application claims the benefit of the European patent application No. 16 188 929.0 filed on Sep. 15, 2016, the entire disclosures of which are incorporated herein by way of reference.

BACKGROUND OF THE INVENTION

The invention relates to an aircraft cabin area comprising a door aisle and an aircraft monument arrangement, to an aircraft comprising said aircraft cabin area and to a method for operating such an aircraft.

For accommodating trolleys suitable for holding supply goods for passengers in an aircraft cabin, modern commercial aircraft are usually equipped with monuments providing respective receiving modules for securely holding the trolleys when these are not used during service times. Such monuments require valuable cabin space which may otherwise be used for additional passenger seats.

SUMMARY OF THE INVENTION

It is therefore an object of the present application to provide an aircraft cabin area with alternative trolley parking places not requiring additional cabin space. Furthermore, it is an object of the present application to provide an aircraft comprising such an aircraft cabin area and a method for operating such an aircraft.

An aircraft cabin area according to the present application comprises a door aisle extending between two opposite aircraft doors and an aircraft monument arrangement. The door aisle has a door section next to each of the two aircraft doors and a monument section extending between the two opposite door sections of the door aisle. The aircraft monument arrangement comprises a first aircraft monument and may comprise at least one further aircraft monument. Within the aircraft cabin area of the present application, the first aircraft monument is arranged to face the door aisle in its monument section with an access side of the first aircraft monument.

The aircraft monument arrangement further comprises at least one first trolley parking place for accommodating at least one trolley. The at least one first trolley parking place is provided in the region of the monument section of the door aisle adjacent the access side of the first aircraft monument so as to enlarge a base area of the first aircraft monument when a trolley is parked therein. As the at least one first trolley parking place is provided in the door aisle monument section, no additional cabin space is occupied, whereas additional cabin space would be occupied when having to provide an additional aircraft monument for housing the at least one trolley which, according to the present application, can be accommodated within the at least one first trolley parking place.

Furthermore, the aircraft cabin area comprises at least one second trolley parking place for accommodating at least one trolley which is provided in the region of at least one of the door sections of the door aisle. Preferably, the at least one second trolley parking place is located in the region of a cabin assistant space of the door aisle in which a cabin crew member can stand during boarding and de-boarding so as to assist the passengers when entering or exiting the aircraft cabin. Also this at least one second trolley parking place location does not require additional cabin space to be occupied by an additional aircraft monument for housing the at least one trolley which, according to the present application, can be accommodated within the at least one second trolley parking place.

During boarding or de-boarding of an aircraft comprising the here described aircraft cabin area, at least one trolley for which no receiving space within an aircraft monument, i.e., no trolley receiving module within an aircraft monument, is present, can be parked in the at least one second trolley parking place in the region of the door aisle door section opposite the aircraft door used by the passengers for entering or exiting the aircraft. The at least one trolley for which no receiving space within an aircraft monument, i.e., no trolley receiving module within an aircraft monument, is present, is referred to as additional trolley in the following. As the aircraft is located stationary on the ground during the latter phases, no secure fastening of the trolley(s) parked in the second trolley parking place(s) is mandatory but respective means may be provided.

During take-off, taxi and landing, i.e., during the flight phases in which the trolleys on board of the aircraft have to be securely stowed for safety reasons, the first trolley parking place(s) in the region of the door aisle monument section is/are available for accommodating the additional trolley(s).

When the aircraft is at cruising altitude, the second trolley parking place(s) in the region of either one of the opposite door sections of the door aisle can be utilized for accommodating the trolley(s). Respective fastening means for securely fastening the trolley(s) in place within the second trolley parking place(s) may be used for securely fastening the trolley(s) parked in the second trolley parking place(s) at cruising altitude.

The aircraft cabin area can thereby be designed considerably more space-savingly as the need for monument receiving space(s) for the additional trolley(s) is omitted. Not only a weight and installation-space saving is the result, but also the installation space saved can be utilized, for example, for the installation of additional seats.

Each of the first and second trolley parking places is preferably adapted to accommodate a half-size trolley. In other words, the dimension and size of each of the first and second trolley parking places preferably allows accommodation of a half-size trolley.

It is desirable that the aircraft cabin area further comprises at least one trolley fastening device for detachably fastening a trolley, especially a half-size trolley, parked in the first or second trolley parking place. In other words, each of the first and second trolley parking places may be provided with a respective trolley fastening device. Preferably, the trolley fastening device is of a design that can be realized relatively inexpensively and does not necessitate any fundamental redesign of an existing aircraft cabin interior. It is therefore even possible in some cases to equip existing aircraft cabin monuments, such as dividing walls present in the door sections of the door aisle and/or a center monument arrangement, which preferably is a center galley arrangement, provided along the monument section of the door aisle, with at least one trolley fastening device and thereby integrate same into an aircraft cabin area according to the present application.

The trolley fastening device for detachably fastening a trolley parked in the first trolley parking place preferably comprises a first holding element pivotally attached to the first aircraft monument so as to be movable between an operating position in which a free end of the first holding element is pivoted away from the first aircraft monument and the first holding element is positioned to abut a side wall of a trolley when the trolley is accommodated in the first trolley parking place and a rest position in which the first holding element is pivoted to abut at least a section of a side, in particular the access side, of the first aircraft monument. Especially, the first holding element may be pivotally attached to the access side of the first aircraft monument and, preferably, at an edge thereof where the access side and an adjacent side wall of the first aircraft monument meet. Especially for the latter arrangement it is also conceivable that the first holding element is foldable away for the rest position into abutment of the access-side-adjacent side wall of the first aircraft monument.

As the first holding element preferably extends at least substantially in parallel to an outer side of the first aircraft monument, this enables a space-saving storage of the first holding element when the first holding element is not in use.

The shape of the first holding element is preferably adapted to the shape of a trolley to be held within the first trolley parking place by means of the holder system. For example, the length along a pivot axis of the first holding element, i.e., its height, can be chosen such that the first holding element covers at least a section of but preferably the whole trolley side wall on which the first holding element abuts in its operating position when the trolley is parked in the first trolley parking place. More general, the length extension of the first holding element may be equal to or less than the height of the first aircraft monument. A pivot axis of the first holding element preferably extends in parallel to the edge of the first aircraft monument where the access side and an adjacent side wall of the first aircraft monument meet.

It is, for example, conceivable that the first holding element also bears the function of a partition wall allowing at least a part of the access side of the first aircraft monument to be shielded from lateral view, when the first holding element is in its operating position. Especially in the latter case, the first holding element can be plate-shaped.

Preferably, the trolley fastening device for detachably fastening a trolley parked in the first trolley parking place further comprises a second holding element pivotally attached to the first holding element so as to be movable between an operating position in which the second holding element is positioned to abut a top of a trolley when the trolley is parked in the first trolley parking place and a rest position in which the second holding element extends at least substantially in parallel to at least a section of a surface of first holding element, the surface extending in parallel to a trolley side wall in the operating position of the first holding element when a trolley is parked in the first trolley parking place.

Thus, when both of the first and second holding elements are in operating position, a side wall and the top of a trolley parked in the first trolley parking place face the trolley fastening system and a further side wall adjacent the one facing the trolley fastening system faces the access side of the first aircraft monument. Therefore, the trolley fastening system at least holds the trolley when parked within the first trolley parking place against movement into the abutment direction of the trolley side wall facing the first holding element, of the adjacent trolley side wall facing the first aircraft monument access side and of the trolley top facing the second holding element.

When the second holding element is in a rest position and the first holding element is in its operating position, the holder system may still be adapted to function as a partition wall. In case the first holding element extends beyond the height of a trolley when parked in the first trolley parking place, it may be only the first holding element which functions as a partition wall. Alternatively, in case the second holding element is pivoted into a rest position in which the second holding extends beyond the first holding element so that an area covered by the first and second holding elements is larger than an area covered by the first holding element alone, the second holding element may be designed to function as an enlargement of the partition wall provided by the first holding element. In other words, it is also conceivable that both of the first and second holding elements function as a partition wall allowing at least a part of the access side of the first aircraft monument to be shielded from lateral view. In the latter case, the first holding element may at least substantially be of the same height as a trolley when parked in the first trolley parking place.

When both of the first and second holding elements are in the rest position, each of the first and second holding elements extends at least substantially in parallel to an outer surface of the first aircraft monument, the outer surface preferably being either a surface of the access side of the first aircraft monument or a surface of a side wall of the first aircraft monument. Thereby, stowage of the holding system when not in use, i.e., when both of the first and second holding elements are in the rest position, is enabled in a space-saving manner.

Moreover, the shape of the second holding element is preferably adapted to the shape and number of trolleys to be held within the first trolley parking place by means of the trolley fastening device. For example, in case only one trolley is to be held within the first trolley parking place, the dimension of the second holding element can be chosen such that the second holding element covers at least a section of but preferably the whole trolley top on which the second holding element abuts in its operating position when the trolley is parked in the first trolley parking place. In case more than one trolley is to be held within the first trolley parking place, the dimension of the second holding element can be chosen such that the second holding element covers at least a section of but preferably the whole trolley top of each trolley on which the second holding element abuts in its operating position when the trolleys are parked in the first trolley parking place.

A trolley fastening device for securely fastening a trolley when parked in a second trolley parking place may have an analogue configuration to the above-described trolley fastening device for securely fastening a trolley when parked in a first trolley parking place, wherein another aircraft monument, such as a sanitary module or a partition wall, may take the place of the first aircraft monument (given that not an access side but a side wall of the other aircraft monument faces the door aisle door section). Otherwise, it is also conceivable that the trolley fastening device for securely fastening a trolley when parked in a second trolley parking place has a different configuration. For example, the alternative trolley fastening device for securely fastening a trolley when parked in a second trolley parking place may have a first holding element pivotally attached to a surface of such another aircraft monument facing the door section of the door aisle, at least a section of which preferably defining an assist space for a crew member, the first holding element being pivotable between an operating position in which the first holding element extends, at least in sections, at least substantially in parallel to a top of a trolley parked in the second trolley parking place. The shape of the first holding element of the different trolley fastening device configuration for securely fastening a trolley when parked in the second trolley parking place is preferably adapted to the shape and number of the trolleys to be fastened within the second trolley parking place by means of the trolley fastening device. For example, the length of the first holding element can be chosen such that the first holding element overlaps the top surfaces of a desired number of trolleys parked in the second trolley parking place.

The alternative trolley fastening device for securely fastening a trolley when parked in a second trolley parking place may also have a second holding element pivotally attached to the first holding element and, especially, to a free end opposite the end of the second holding element pivotally attached to the surface of the other aircraft monument. The second holding element is pivotable into an operating position in which it extends at least substantially in parallel to at least to a section of a side wall of a trolley when parked in the second trolley parking place. In other words, when both of the first and second holding elements of the alternative trolley fastening device are in operating positions, the second holding element overlaps at least one trolley parked in the second trolley parking place and, thus, ensures a secure fixing of one and any further trolley parked in the second trolley parking place sandwiched between the aircraft monument surface to which the first holding element of the alternative trolley fastening device is pivotally attached and the one trolley farthest away from the aircraft monument surface and overlapped by the second holding element of the alternative trolley fastening device.

In case the alternative trolley fastening device comprising a first and a second holding element, preferably at least the first holding element is plate-shaped, in order to enable utilization of the first holding element as a surface on which to place things and, optionally, on which to work, when the first holding element is in its operating position.

Further, at least one of the first and second holding elements of any of the above-described trolley fastening devices may comprise means for releasably engaging at least one trolley when parked in the first or second trolley parking place so as to temporarily fix the at least one trolley in place within the first or second trolley parking place. The means for releasably engaging at least one trolley when parked within the first or second trolley parking place may be adapted to engage the top of each trolley parked in the first or second trolley parking place and/or at least one of the side walls of at least one trolley parked in the first or second trolley parking place. If desired, the means for releasably engaging at least one trolley when parked in the first or second trolley parking place can be realized as a connecting device which is configured to cooperate with a complementary connecting device provided, for example, in the region of the top surface or at least one side wall of at least one trolley when parked in the first or second trolley parking place. Such a connecting system can ensure a secure connection of the trolley fastening device to at least one trolley parked in the first or second trolley parking place.

Furthermore, the trolley fastening device of any of the above-described configurations may comprise at least one latching mechanism for latching at least one of the first and second holding elements in at least one of its operating and rest positions.

The aircraft monument arrangement may further comprise a second aircraft monument arranged in parallel to the first aircraft monument so as to face the access side of the first aircraft monument and spaced apart from the first aircraft monument by at least the width of the monument section of the door aisle. The width of the monument section of the door aisle between the first and second aircraft monuments preferably is the sum of the minimal width of the door aisle required according to safety regulations, the minimal width commonly being 20 inches, and the depth of a trolley for which the first trolley parking place is designed to accommodate.

It is to be understood that, in line with the present application, in case more than one trolley is to be parked in the first trolley parking place, the trolleys are to be placed side-by-side in parallel to the length extension of the door aisle and the first aircraft monument so that each of the trolleys faces the monument section of the door aisle with one side wall thereof, wherein each trolley generally comprises a top, a bottom and four side walls, at least one of the latter allowing the interior of the trolley to be accessed.

In a preferred version of the present application, at least one of the first and second aircraft monuments is a galley and/or accommodates at least one galley module. A galley module, for example, may comprise at least one galley insert preferably being at least one of an oven, a refrigerator, a coffee/tea maker and a trolley.

In case of at least the first aircraft monument being a galley commonly loaded with full-size trolleys, the working area in front of the galley, i.e., next to its access side, for handling reasons is recommended to be 39 inches. In case of a center galley arrangement comprising the at least one first galley aircraft monument adjacent the monument section of the door aisle, the door aisle preferably separating two passenger sections of an aircraft, the 39 inches working area constituting the width of the door aisle monument section also include the 20 inches minimal width for the door aisle as required for safety reasons. The first galley aircraft monument may therefore be provided with at least one first trolley parking place for accommodating at least one half-size trolley of 16 inches depth while still providing the required 20 inches minimal width for the door aisle.

The aircraft cabin area according to the present application may further comprise two main aisles extending in parallel to the longitudinal extension of the aircraft cabin. The monument section of the door aisle then extends between the crossing sections of the door aisle with each of the two main aisles. As a general option, the door aisle may separate two passenger seat sections of the aircraft cabin.

An aircraft according to the present application comprises an above-described aircraft cabin area. When the above-described aircraft cabin area is comprised in an aircraft, the first aircraft monument is preferably located such that its access side faces in a direction opposite the flight direction of the aircraft.

In the case of a method according to the present application for operating an aircraft equipped with an above-described aircraft cabin area, at least one trolley suitable for holding supply goods for the passengers in the aircraft cabin is parked in at least one first trolley parking place of the aircraft cabin area during the take-off, during the taxi and during the landing of the aircraft.

The at least one trolley to be parked in the at least one first or second trolley parking place preferably is a half-size trolley. As a consequence, the first and second trolley parking places preferably are designed to accommodate at least one such half-size trolley.

When the aircraft is flying at cruising altitude, the at least one trolley is preferably parked in the at least one second trolley parking place of the aircraft cabin area.

The at least one trolley can be fastened in its position in the at least one first trolley parking place and/or in its position in the at least one second trolley parking place by means of at least one trolley fastening device.

BRIEF DESCRIPTION OF THE DRAWINGS

A preferred embodiment of the present application is now explained in more detail with reference to the appended schematic drawings, of which.

DETAILED DESCRIPTION OF THE PREFERRED EMBODIMENTS

The preferred embodiment of an aircraft cabin area 100 according to the present application is illustrated in FIGS. 1A to 3B in the state when comprised in an aircraft.

Figure 1A:
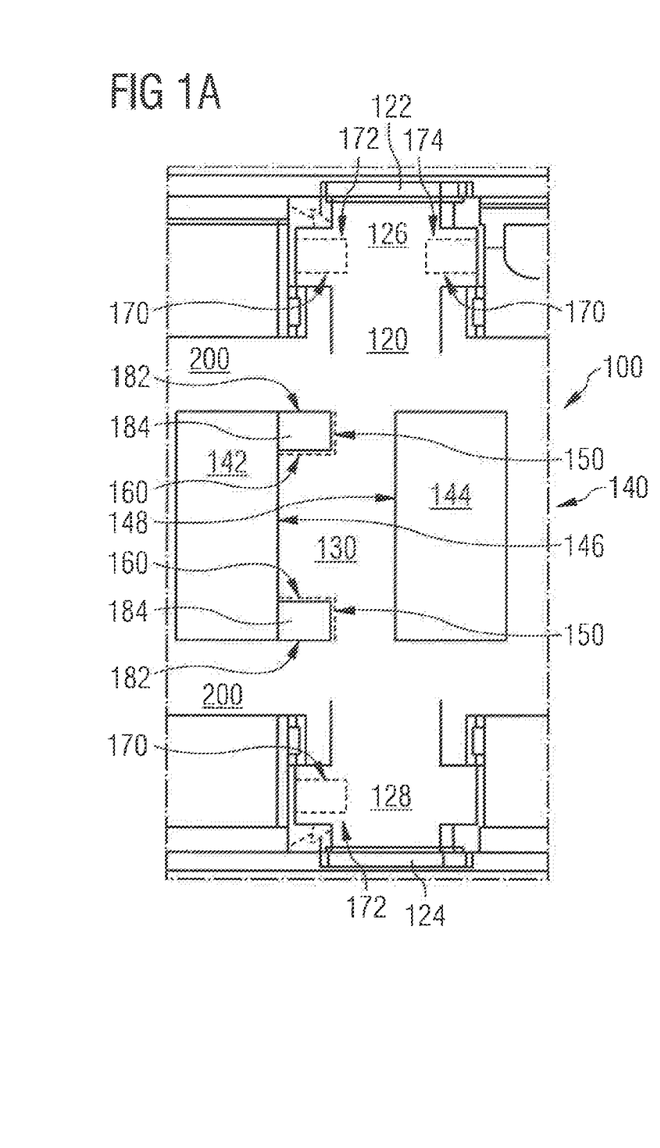
FIG. 1A shows a plan view of an aircraft cabin area of the present application during take-off, taxi and landing with trolleys parked in respective first trolley parking places of an aircraft monument arrangement of the aircraft cabin area.
Figure 2A:
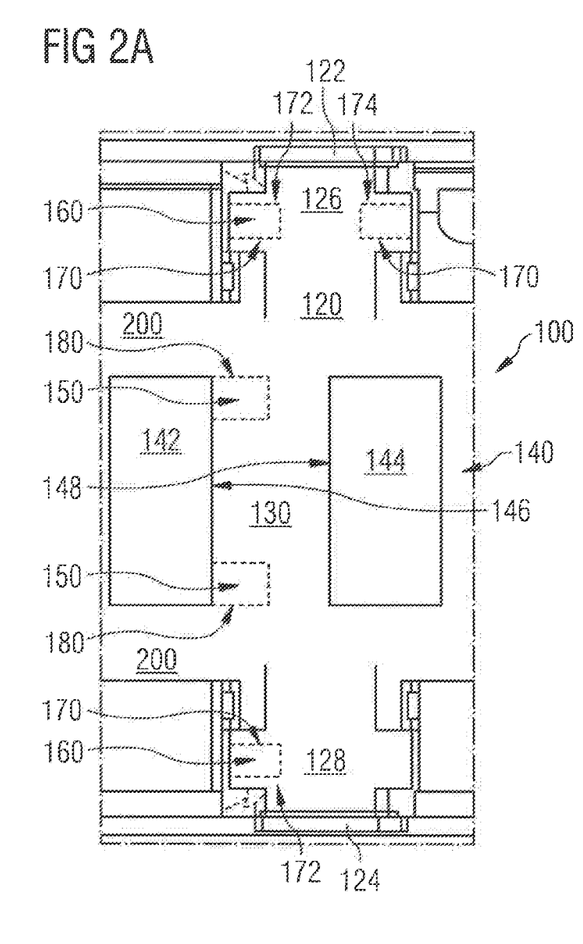
FIG. 2A shows a plan view of an aircraft cabin area of the present application during flight, i.e., with the aircraft equipped with the aircraft cabin area at cruising altitude, with trolleys parked in respective second trolley parking places of the aircraft cabin area.
Figure 3A:
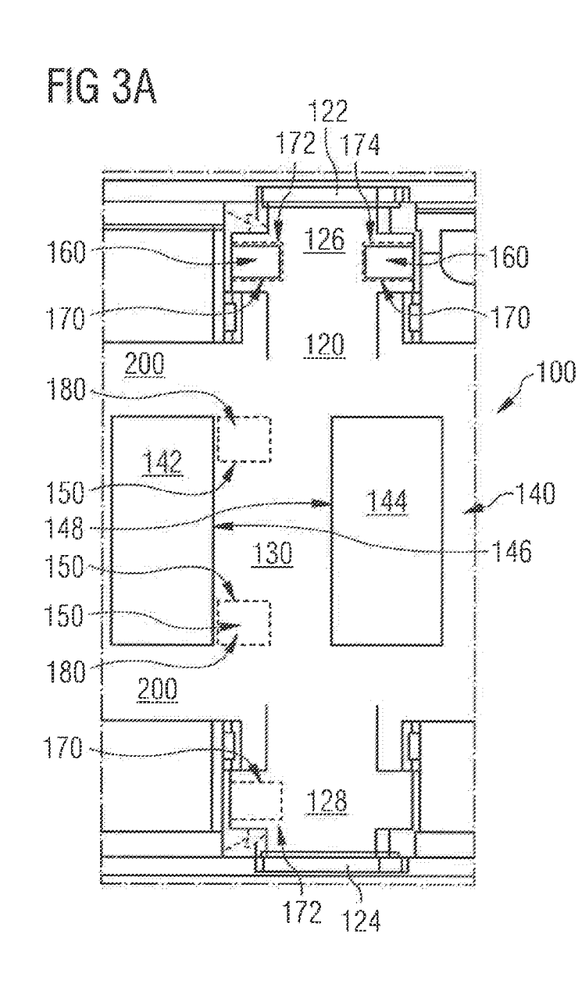
FIG. 3A shows a plan view of an aircraft cabin area of the present application during boarding or de-boarding, i.e., with the aircraft equipped with the aircraft cabin area in its parking position on the ground, with trolleys parked in respective second trolley parking places in only one door section of the door aisle of the aircraft cabin area.

An aircraft cabin area 100 is shown in FIGS. 1A, 2A and 3A to comprise, in line with the present application, a door aisle 120 extending between two opposite aircraft doors 122, 124 and an aircraft monument arrangement 140. The door aisle has a door section 126, 128 next to each of the two aircraft doors 122, 124 and a monument section 130 extending between the two opposite door sections 126, 128 of the door aisle 120. The aircraft monument arrangement 140 comprises a first aircraft monument 142 and a second aircraft monument 144. Within the aircraft cabin area 100, the first and second aircraft monuments 142, 144 are arranged to face the door aisle 120 in its monument section 130 with respective access sides 146, 148 of the first and second aircraft monuments 142, 144.

The access side 148 of the second aircraft monument 144 is, thus, arranged in parallel to the access side 146 of the first aircraft monument 142 and the second aircraft monument 144 is spaced apart from the first aircraft monument 142 by at least the width of the monument section 130 of the door aisle 120. The width of the monument section 130 of the door aisle 120 between the first and second aircraft monuments 142, 144 preferably is the sum of at least the minimal width of the door aisle 120 required according to safety regulations, the minimal width commonly being 20 inches, and the depth of a trolley 160 for which the first trolley parking place 150 is designed to accommodate.

In accordance with the preferred embodiment shown in the figures, the aircraft monument arrangement 140 is a center galley with the first and second aircraft monuments 142, 144 being galley monuments respectively adapted to accommodate at least one galley module 142m. At least one of the galley modules 142m is adapted to accommodate a full-size trolley. Any further galley modules 142m, for example, may comprise at least one other galley insert such as an oven, a refrigerator or a coffee/tea maker.

As the first aircraft monument 142 is a galley loaded with at least one full-size trolley, the working area in front of the galley, i.e., next to its access side 146, for handling reasons is recommended to be 39 inches. For the latter case the width of the monument section 130 of the door aisle 120 between the first and second aircraft monuments 142, 144 is 39 inches, including the minimal width of 20 inches of the door aisle 120 required according to safety regulations plus 2 inches and including the depth of 16 inches of a half-size trolley 160 for which the first trolley parking place 150 is designed to accommodate. The first galley aircraft monument 142 can therefore be provided with the first trolley parking places 150 for accommodating half-size trolleys 160 of 16 inches depth while still providing the required 20 inches minimal width for the door aisle 120.

The aircraft cabin area 100, as shown in FIGS. 1A, 2A and 3A, further comprises two main aisles 200 extending in parallel to the longitudinal extension of the aircraft cabin. The monument section 130 of the door aisle 120 extends between the crossing sections of the door aisle 120 with each of the two main aisles 200. According to a special case, such as for the aircraft monument arrangement 140 being a center galley as described above, the door aisle 120 may separate two passenger seat sections of the aircraft cabin.

The aircraft monument arrangement 140 further comprises at least one and, in accordance with the preferred embodiment shown in the figures, especially two first trolley parking places 150, each for accommodating at least one and, in accordance with the preferred embodiment shown in the figures, especially a single trolley 160. The first trolley parking places 150 are provided in the region of the monument section 130 of the door aisle 120 adjacent the access side 146 of the first aircraft monument 142 so as to enlarge a base area of the first aircraft monument 142 when a trolley 160 is parked therein (see FIG. 1A in view of FIG. 2A).

Furthermore, the aircraft cabin area 100 comprises at least one and, in accordance with the preferred embodiment shown in the figures, especially three second trolley parking places 170, each for accommodating at least one and, in accordance with the preferred embodiment shown in the figures, especially a single trolley 160. The second trolley parking places 170 are provided in the regions of the opposite door sections 126, 128 of the door aisle 120. According to the preferred embodiment shown, two second trolley parking places are located in the door section 126 and one second trolley parking place is located in the opposite door section 128 (see FIGS. 1A, 2A, 3A). Especially, each door section 126, 128 comprises at least one cabin assist space 172 in which a cabin crew member can stand during boarding and de-boarding of the aircraft or, in case of an emergency, so as to assist the passengers when entering or exiting the aircraft. According to the preferred embodiment, two of the second trolley parking places 170 are located in these cabin assist spaces 172 and the third trolley parking place 170 is located in a spaced-apart region 174 of the door aisle door section 126 opposite the cabin assist space 172 of the door aisle door section 126.

Each of the first and second trolley parking places 150, 170 is designed to accommodate a half-size trolley 160, i.e., a trolley having common trolley dimensions except for the depth which is only half the depth of a common trolley, namely 16 inches. In other words, the dimension and size of each of the first and second trolley parking places 150, 170 allows accommodation of such a half-size trolley 160.

FIG. 1A shows a constellation of the here described aircraft cabin area 100 during take-off, taxi and landing. During take-off, taxi and landing, i.e., during the flight phases in which the trolleys on board of the aircraft have to be securely stowed for safety reasons, the first trolley parking places 150 in the region of the door aisle monument section 130 are available for accommodating two trolleys 160 for which no receiving space within an aircraft monument, i.e., no trolley receiving module within, for example, one of the first and second aircraft monuments 142, 144 or another aircraft monument, is present. The latter two trolleys 160, which are half-size trolleys 160 in accordance with the preferred embodiment shown, are referred to in the following as additional trolleys 160.

FIG. 2A shows a constellation of the here described aircraft cabin area 100 during flight, i.e., when the aircraft provided with the aircraft cabin area 100 is at cruising altitude. During flight, the second trolley parking places 170 in the crew assist spaces 172 of the opposite door sections 126, 128 of the door aisle 120 are utilized for accommodating the additional trolleys 160. Respective fastening means for securely fastening the trolleys 160 in place within the second trolley parking places 170 may be used for securely fastening the trolleys 160 parked in the second trolley parking places 170 at cruising altitude.

FIG. 3A shows a constellation of the here described aircraft cabin area 100 during boarding or de-boarding. During boarding or de-boarding of an aircraft comprising the here described aircraft cabin area 100, the two additional trolleys 160 are parked in the two second trolley parking places 170 respectively located in the crew assist space 172 and the spaced-apart opposite region 174 of the door aisle door section 126 opposite the aircraft door 124 used by passengers for entering or exiting the aircraft. As the aircraft is located stationary on the ground during boarding and de-boarding, no secure fastening of the trolleys 160 parked in the second trolley parking places 170 is mandatory but respective fastening means may be provided and/or used.

The aircraft cabin area 100 is thereby designed considerably more space-savingly as the need for monument receiving spaces for the additional trolleys 160 is omitted. Not only a weight and installation-space saving is the result but also the installation space saved can be utilized, for example, for the installation of additional seats.

According to the preferred embodiment shown, at least the first trolley parking places 150 are provided with respective trolley fastening devices 180 for detachably fastening a trolley 160, here a half-size trolley 160, parked in the first trolley parking place 150. The trolley fastening device 180 for detachably fastening a trolley 160 parked in the first trolley parking place 150 comprises a first holding element 182 pivotally attached to the first aircraft monument 142 so as to be movable between an operating position in which a free end of the first holding element 182 is pivoted away from the first aircraft monument 142 and the first holding element 182 is positioned to abut a side wall of a trolley 160 when the trolley 160 is accommodated in the first trolley parking place 150 (see FIG. 1B in view of FIG. 3B) and a rest position in which the first holding element 182 is pivoted to abut at least a section of a side, here the access side 146, of the first aircraft monument 142 (see FIG. 3B). According to the preferred embodiment shown, the first holding element 182 is pivotally attached to the access side 146 of the first aircraft monument 142 at an edge 146e thereof where the access side 146 and an adjacent side wall 142s of the first aircraft monument 142 meet. A pivot axis A of the first holding element 182 extends along the edge 146e of the first aircraft monument 142. For this arrangement it is also conceivable that the first holding element 182 is foldable away for the rest position into abutment of the access-side-adjacent side wall 142s of the first aircraft monument 142 (which is not shown in FIG. 3B).

As the first holding element 182 extends substantially parallel to an outer side 146 or 142s of the first aircraft monument 142, this enables a space-saving storage of the first holding element 182 when the first holding element 182 is not in operation, but in one of its rest positions.

The first holding element 182 is shown throughout the figures to be plate-shaped, and the length along the pivot axis A of the first holding element 182, i.e., its height, is chosen to be equal to the height of the trolley 160 to be accommodated within the first trolley parking place 150.

The trolley fastening device 180 for detachably fastening a trolley 160 parked in the first trolley parking place 150 further comprises a second holding element 184 pivotally attached to the first holding element 182 so as to be movable between an operating position in which the second holding element 182 is positioned to abut a top of a trolley 160 when the trolley 160 is parked in the first trolley parking place 150 (see FIG. 1B) and a rest position in which the second holding element 184 extends substantially in parallel to at least a section of a surface of the first holding element 182 (see FIG. 3B), the surface extending in parallel to a trolley side wall in the operating position of the first holding element 182 when a trolley 160 is parked in the first trolley parking place 150. A pivot axis B of the second holding element 184 extends perpendicularly to the pivot axis A of the first holding element 182.

Also, the second holding element 184 is plate-shaped and its dimension is equal to the dimension of the trolley's top on which the second holding element 184 abuts when the trolley 160 is parked in the first trolley parking place 150.

Figure 1B:
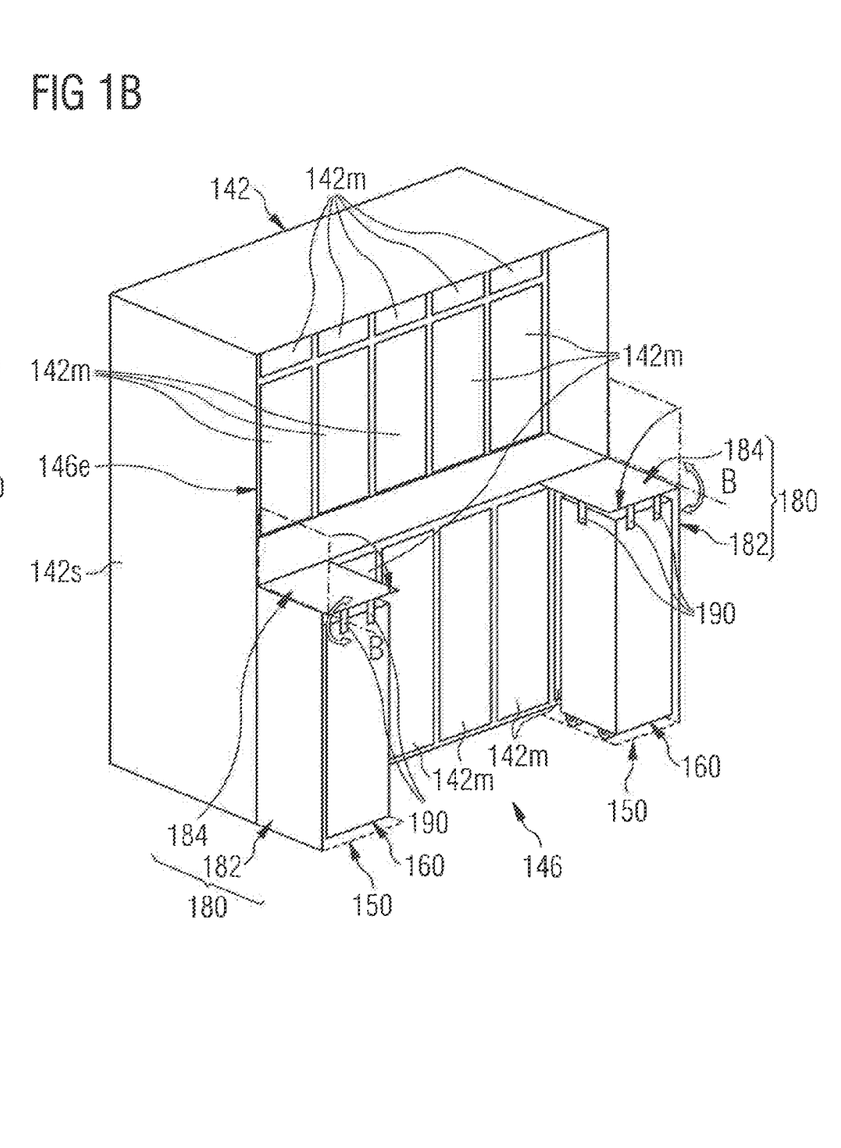
FIG. 1B shows a three-dimensional view of a first aircraft monument and the first trolley parking places of the aircraft monument arrangement within the aircraft cabin area according to FIG. 1A.

Thus, when both of the first and second holding elements 182, 184 are in an operating position, a side wall and the top of a trolley 160 parked in the first trolley parking place 150 face the trolley fastening system 180 and a further side wall adjacent the one facing the trolley fastening system 180 faces the access side 146 of the first aircraft monument 142 (see FIG. 1B). Therefore, the trolley fastening system 180 at least holds the trolley 160 when parked within the first trolley parking place 150 against movement into the abutment direction of the trolley side wall facing the first holding element 182, of the adjacent trolley side wall facing the first aircraft monument access side 146 and of the trolley top facing the second holding element 184.

When the second holding element 184 is in a rest position and the first holding element 182 is in its operating position (see FIG. 2B), the trolley fastening device 180 is adapted to function as a partition wall allowing at least a part of the access side 146 of the first aircraft monument 142 to be shielded from lateral view.

Figure 3B:
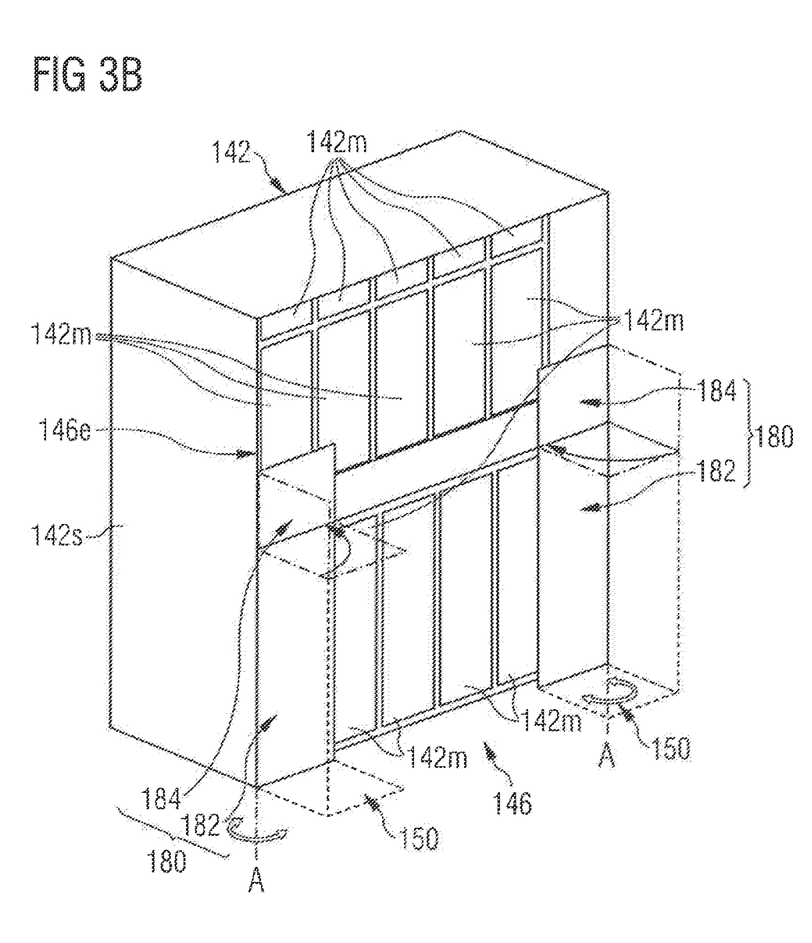
FIG. 3B shows a three-dimensional view of a first aircraft monument according to FIG. 2B with no trolleys present in the first trolley parking places and with the trolley fastening devices for detachably fastening a trolley in each of the first trolley parking places folded into their rest positions in line with the constellation shown in FIG. 3A.

When both of the first and second holding elements 182, 184 are in the rest position (see FIG. 3B), each of the first and second holding elements 182, 184 extends substantially in parallel to an outer surface of the first aircraft monument 146, which is the access side 146 of the first aircraft monument 142 according to FIGS. 3A, 3B. Thereby, stowage of the trolley fastening device 180 when not in use, i.e., when both of the first and second holding elements 182, 184 are in the rest position, is enabled in a space-saving manner.

Figure 2B:
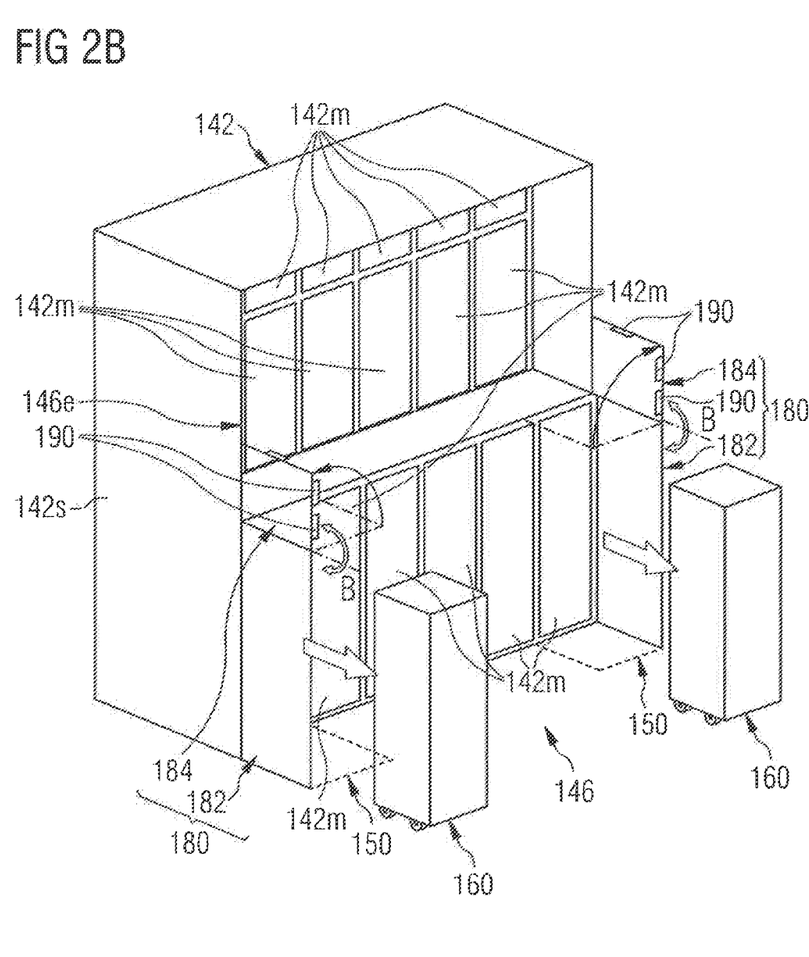
FIG. 2B shows a three-dimensional view of a first aircraft monument according to FIG. 1B with the trolleys moved out of the first trolley parking places for movement to the second trolley parking places so as to end up in the constellation shown in FIG. 2A and with trolley fastening devices for detachably fastening a trolley in each of the first trolley parking places positioned so as to function as partition walls.

As shown in FIGS. 1B and 2B, at least the second holding element 184 of trolley fastening device 180 comprises means 190 for releasably engaging the trolley 160 when parked in the first trolley parking place 150 so as to temporarily fix the trolley 160 in place within the first trolley parking place 150. The means 190 for releasably engaging the trolley 160 when parked within the first trolley parking place 150 is adapted to engage the remaining two free adjacent side walls of the trolley 160 parked in the first trolley parking place 150 (see FIG. 1B) so as to hinder the trolley 160 when parked in the first trolley parking place 150 also from movement in direction away from the first aircraft monument access side 146 and in direction in parallel to the longitudinal extension of the door aisle 120. In fact, as already mentioned, when the trolley 160 is parked in the first trolley parking place 150, one trolley side wall is in abutment with the first holding element 182 and an adjacent trolley side wall faces the access side 146 of the first aircraft monument 142. Thereby, movement of the trolley 160 out of the first trolley parking place 150 is securely omitted.

Even though not shown in the figures, the trolley fastening device 180 preferably further comprises at least one latching mechanism for latching at least one of the first and second holding elements 182, 184 in at least one of its operating and rest positions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin area, comprising:
 a door aisle extending between two opposite aircraft doors, the door aisle having a door section next to each of the two aircraft doors, and
 an aircraft monument arrangement, comprising:
  a first aircraft monument facing the door aisle in a monument section of the door aisle with an access side of the first aircraft monument, the monument section of the door aisle extending between the two opposite door sections of the door aisle, and
  at least one first trolley parking place for accommodating at least one trolley, said at least one first trolley parking place provided in a region of the monument section of the door aisle adjacent the access side of the first aircraft monument so as to enlarge a base area of the first aircraft monument when a trolley is parked therein,
 wherein at least one second trolley parking place for accommodating at least one trolley is provided in a region of at least one of said door sections of the door aisle,
 wherein the aircraft area further comprises at least one trolley fastening device for detachably fastening a trolley parked in the at least one first trolley parking place,
 the at least one trolley fastening device for detachably fastening a trolley parked in the at least one first trolley parking place comprises a first holding element pivotally attached to the first aircraft monument so as to be movable between an operating position in which a free end of the first holding element is pivoted away from the first aircraft monument and the first holding element is positioned to abut a side wall of a trolley when the trolley is accommodated in the first trolley parking place and a rest position in which the first holding element is pivoted to abut at least a section of a side of the first aircraft monument,
 wherein the at least one trolley fastening device configured to detachably fasten a trolley parked in the first trolley parking place further comprises a second holding element pivotally attached to the first holding element so as to be movable between an operating position in which the second holding element is positioned to abut a top of a trolley when the trolley is parked in the first trolley parking place and a rest position in which the second holding element extends at least substantially in parallel to at least a section of a surface of the first holding element,
 wherein the first holding element pivots about a first axis and the second holding element pivots about a second axis, and the first axis is perpendicular to the second axis.

2. The aircraft cabin area according to claim 1, wherein each of the first and second trolley parking places is adapted to accommodate a half-size trolley.

3. The aircraft cabin area according to claim 1, wherein the at least one trolley fastening device is configured to detachably fasten a half-sized trolley.

4. The aircraft cabin area according to claim 1, wherein the first holding element of the at least one trolley fastening device configured to detachably fasten a trolley parked in the at least one first trolley parking place is pivoted to abut at least a section of the access side, of the first aircraft monument when in the rest position.

5. The aircraft cabin area according to claim 4, wherein the second holding element of the at least one trolley fastening device configured to detachably fasten a trolley parked in the at least one first trolley parking place is pivoted to abut at least a section of the access side, of the first aircraft monument when in the rest position.

6. The aircraft cabin area according to claim 5, wherein at least one of the first and second holding elements comprises surfaces configured to engage a trolley accommodated in the first trolley parking place so as to temporarily fix the trolley in place within the first trolley parking place.

7. The aircraft cabin area according to claim 6, wherein said surfaces configured to engage a trolley accommodated in the first trolley parking place are adapted to engage at least one of the top or at least one of the side walls of the trolley when accommodated in the first trolley parking place.

8. The aircraft cabin area according to claim 1, wherein the aircraft monument arrangement further comprises a second aircraft monument arranged in parallel with the first aircraft monument so as to face the access side of the first aircraft monument and spaced apart from the first aircraft monument by at least the width of the monument section of the door aisle.

9. The aircraft cabin area according to claim 8, wherein at least one of the first and the second aircraft monuments is at least one of a galley or accommodates at least one galley module.

10. The aircraft cabin area according to claim 1, further comprising two main aisles extending in parallel to the longitudinal extension of the aircraft cabin, wherein the monument section of the door aisle extends between crossing sections of the door aisle with each of the two main aisles and, optionally, wherein the door aisle separates two passenger seat sections of the aircraft cabin.

11. The aircraft cabin area according to claim 1, wherein the at least one second trolley parking place for accommodating at least one trolley, which is provided in the region of at least one of said door sections of the door aisle, is located in a region of a cabin assistant space of the door aisle, in which a cabin crew member can assist passengers during boarding and de-boarding of the aircraft.

12. An aircraft having an aircraft cabin area according to claim 1.

13. A method for operating an aircraft according to claim 12, in which at least one trolley suitable for holding supply goods for the passengers in the aircraft cabin is parked in the at least one first trolley parking place of the aircraft monument arrangement during at least one of a takeoff and a landing of the aircraft.

14. The method according to claim 13, wherein the at least one trolley is parked in the at least one second trolley parking place of the aircraft cabin area when the aircraft is flying at cruising altitude.

15. The method according to claim 13, wherein the trolley is a half-size trolley.

16. An aircraft cabin area, comprising:
a door aisle extending between two opposite aircraft doors, the door aisle having a door section next to each of the two aircraft doors, and
an aircraft monument arrangement, comprising:
a first aircraft monument facing the door aisle in a monument section of the door aisle with an access side of the first aircraft monument, the monument section of the door aisle extending between the two opposite door sections of the door aisle, and
at least one first trolley parking place for accommodating at least one trolley, said at least one first trolley parking place provided in a region of the monument section of the door aisle adjacent the access side of the first aircraft monument so as to enlarge a base area of the first aircraft monument when a trolley is parked therein,
wherein at least one second trolley parking place for accommodating at least one trolley is provided in a region of at least one of said door sections of the door aisle,
wherein the aircraft area further comprises at least one trolley fastening device for detachably fastening a trolley parked in the at least one first trolley parking place,
the at least one trolley fastening device for detachably fastening a trolley parked in the at least one first trolley parking place comprises a first holding element pivotally attached to the first aircraft monument so as to be movable between an operating position in which a free end of the first holding element is pivoted away from the first aircraft monument and the first holding element is positioned to abut a side wall of a trolley when the trolley is accommodated in the first trolley parking place and a rest position in which the first holding element is pivoted to abut a section of one of the access side or an access-side-adjacent side wall of the first aircraft monument,
wherein the at least one trolley fastening device configured to detachably fasten a trolley parked in the first trolley parking place further comprises a second holding element pivotally attached to the first holding element so as to be movable between an operating position in which the second holding element is positioned to abut a top of a trolley when the trolley is parked in the first trolley parking place and a rest position in which the second holding element extends at least substantially in parallel to at least a section of a surface of the first holding element,
wherein the first holding element pivots about a first axis and the second holding element pivots about a second axis, and the first axis is perpendicular to the second axis.

* * * * *